Sept. 19, 1967 R. CARRE ET AL 3,343,157

DIGITAL PHASE CODER

Filed Oct. 27, 1964 3 Sheets-Sheet 1

United States Patent Office 3,343,157

Patented Sept. 19, 1967

3,343,157

DIGITAL PHASE CODER

Roland Carre and Robert Charton, Paris, France, assignors to CSF—Compagnie Generale de Telegraphie Sans Fil, a corporation of France

Filed Oct. 27, 1964, Ser. No. 406,782
Claims priority, application France, Oct. 30, 1963, 952,269
7 Claims. (Cl. 340—347)

The present invention relates to phase coding more particularly for radar systems. In such systems analog-to-digital converters are generally necessary and it is an object of the invention to avoid the use of such converters.

The invention provides a digital coder which delivers directly in a code having a base B, for example in a binary system, a number having $n$ digits and representing the measured phase angle. This number can be stored in a register in order to be used in digital machines.

The binary coder according to the invention comprises a comparator circuit, which comprises N phase shifters (N being equal to $B^n$), and determines two successive phase values, which are successive multiples of $2\pi/N$ and between which the phase to be measured is comprised. This circuit feeds a matrix which delivers an $n$ digit coded number, each digit being represented by the lack or the presence of a voltage.

The comparator circuit comprises two input channels, which receive the two sinusoidal waves whose respective phase shift is to be measured. For convenience, let one of said signals be called "reference signal," the corresponding channel being called "reference channel" and let the other of said signals be called "received signal," the corresponding channel being called "receiving channel."

For the sake of example, it will be assumed hereafter that the reference signal leads the received signal.

The reference channel comprises N identical phase shifters, connected in series, each phase shifter impressing on the signal a phase shift $\varphi_0$ such that $N\varphi_0=2\pi$ or $\pi$. There is one output after each phase shifter. N conventional phase detectors, for example diode detectors, are respectively coupled to said outputs and to the receiving channel.

By comparing the sign of the detected signals, a coded value of the phase to within a multiple of $\varphi_0$ is obtained. To this end, the detector output signals are applied to a logic system, connected to a matrix.

For a better understanding of the invention and in order to show how the same may be carried into effect, reference is made to the accompanying drawing, in which.

For the sake of simplicity it will be assumed that the phases are coded in the binary code, but obviously any other code can be used.

Figure 1:
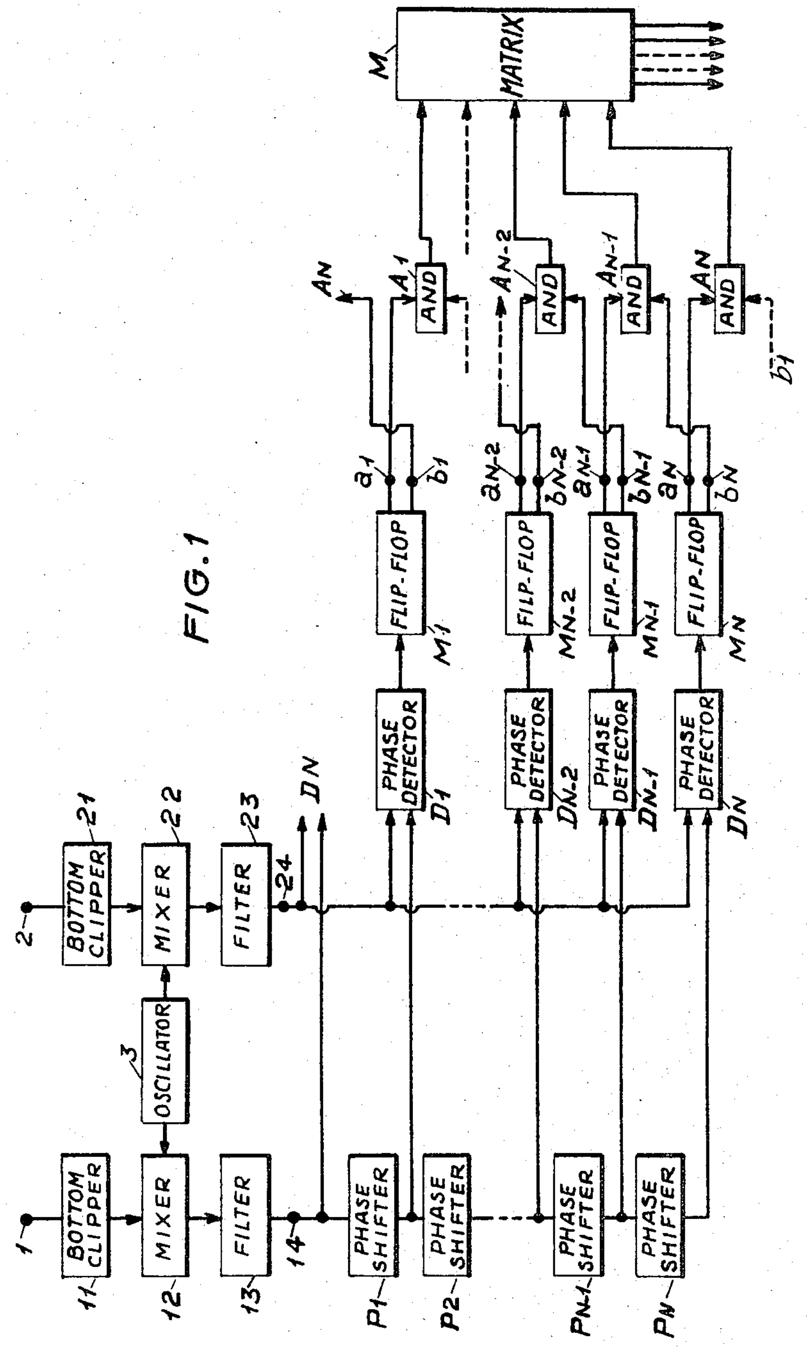
FIG. 1 is a block diagram showing a phase coder according to the invention.

The system shown in FIG. 1 comprises two channels 1 and 2 which respectively receive the two signals, whose relative phase shift $\varphi$ is to be measured. Channel 1 comprises in series: a bottom clipper 11, a mixer 12, a filter 13 and an output terminal 14. Channel 2 comprises a bottom clipper 21, a mixer 22, a filter 23 and an output terminal 24.

A variable frequency oscillator 3 feeds mixers 12 and 22. The signals at outputs 14 and 25 have been bottom clipped above the thermal noise level, by suitably adjusting clippers 11 and 21, and their frequency is made constant through adjusting oscillator 3.

To terminal 14, are connected in series $N=2^n$ identical phase shifters, each providing a phase shift $\varphi_0$ such that $N\varphi_0=2\pi$. N conventional phase detectors D1 to DN, of the type supplying an output signal whose sign changes along with the sign of the phase shift sign (lag or lead) between the input signals, are respectively connected to terminal 24 and to the respective outputs of phase shifters P1 to PN. The total phase shift being equal to $2\pi$, either the output of phase-shifter PN or terminal 14 may be connected to phase detector DN, as shown on FIG. 1.

The output signals from the N detectors are respectively applied to the control inputs of N bistable multivibrators M1 to MN. These multivibrators are such that the voltage collected at output $ai$ of a multivibrator $$Mi\ (i=1, 2, 3, \ldots N)$$

is positive, and the output from the other output is negative, whenever the signal applied to the control input is positive, the reverse taking place whenever this signal is negative. The outputs of these multivibrators are two by two connected to the respective inputs of N AND-circuits A1 to AN, the connections being such that the two inputs of an AND-circuit A$i$ are respectively connected to the output $ai$ of a multivibrator M$i$ and to the outputs $bj$ of multivibrator M$j$ (with $j=i+1$ for $i+N$ and $j=1$ for $i=N$) immediately following multivibrator M$i$. Both inputs of an AND-circuit A$i$ will then be positive only if the output signals of detectors D$i$ and D$j$ are of opposite signs, which is true only if $\varphi_0<\varphi<(i+1)\varphi_0$.

The respective outputs of AND-circuits A1 to AN are connected to the N coding inputs of a matrix M which delivers in parallel on $n$ output wires $n$ binary digits corresponding to the value written in by the output signal of the A$i$ circuit, each digit being represented by the presence or the absence of a voltage.

These voltages can be stored in a magnetic core storage system, from where they will be extracted in a manner known per se in order to be used directly in digital computer machines.

The phase $\varphi$ is determined with a precision depending on number $n$. In most applications, for example in radar systems, a great precision is not demanded, and $n$ may be taken equal to 6.

The number of elements in the system may be reduced while keeping the same precision, or the precision may be improved, with a $(n+1)$ digit matrix, without it being necessary to double the number of elementary circuits, by modifying the above described circuit as follows. The output voltages from detectors D$i$ and D$i+1$, which correspond to $i\varphi_0<\varphi<(i+1)\varphi_0$, are practically linear functions of the phase differences they detect, since said phase shifts are in neighbourhood of zero. Let V$i$ be the output voltage from detector D$i$ and V$i+1$ the output from detector D$i+1$, V$i$ being positive and V$i+1$ negative, the phase $\varphi$ is comprised between $$i\varphi_0+\frac{\varphi_0}{2}$$

if V$i+1$ is positive and between $$i\varphi_0+\frac{\varphi_0}{2}$$

and $(i+1)\varphi_0$ if V$i+1$ is negative. By placing in parallel, between the outputs of two successive detectors, a network comprising two equal resistors and a center tap, the phase value to within $\varphi_0/2$ can be readily determined according to the voltage sign at said tap.

Figure 2:
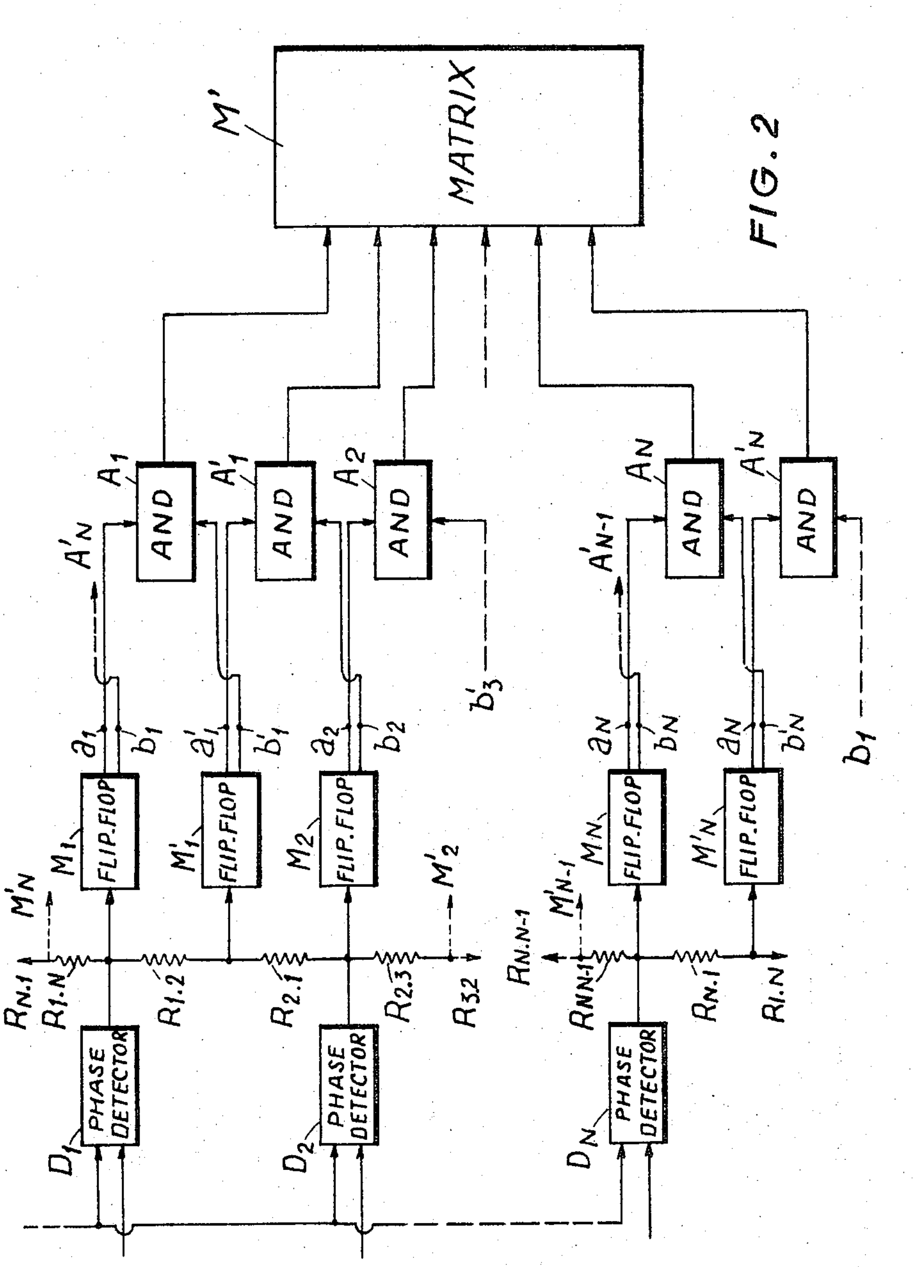
FIGS. 2 and 3 show alternative embodiments of the invention.

FIG. 2 shows the modifications to be brought to the diagram of FIG. 1 for use in connection with a $(n+1)$ digit matrix M'. The outputs of any two successive phase detectors D$i$ and D$j$ are now coupled to each other through equal resistors R$ij$ and R$ji$, in series. The respective center taps of each such group of resistors are connected to N additional flip-flop circuits M'1 to M'N, respectively inserted between adjacent circuits M1M2, M2M3, . . . MN-1 MN, MNM1 and N additional AND-circuits, A'1 to A'N are inserted between circuits A1 to AN and connected to N further inputs of matrix M', inserted between the N inputs to which gates A*i* are connected. In other words, according to whether an *n* or an $n+1$ digit binary coding is desired (to which correspond respectively to $2^n$ or a $2^{n+1}$ input matrix) one will have to take $N=2^{n-1}$ or $N=2^{n+1}$.

Such a modified system enables either to obtain, with half the number of phase shifters, the same accuracy as with the system of FIG. 1 or, with an equal number of phase shifters, an improved accuracy.

The circuit, arrangement of FIG. 1 can also be modified, while still keeping the same advantages as in the circuit if FIG. 2, by adding to it N further AND-circuits, respectively connected to the complementary outputs of flip flops M*i*, the phase shift provided by one phase shifter being then $$\varphi_0=\frac{\pi}{N}$$

which means that the phase shift provided by all the phase shifters is then $\pi$.

Figure 3:
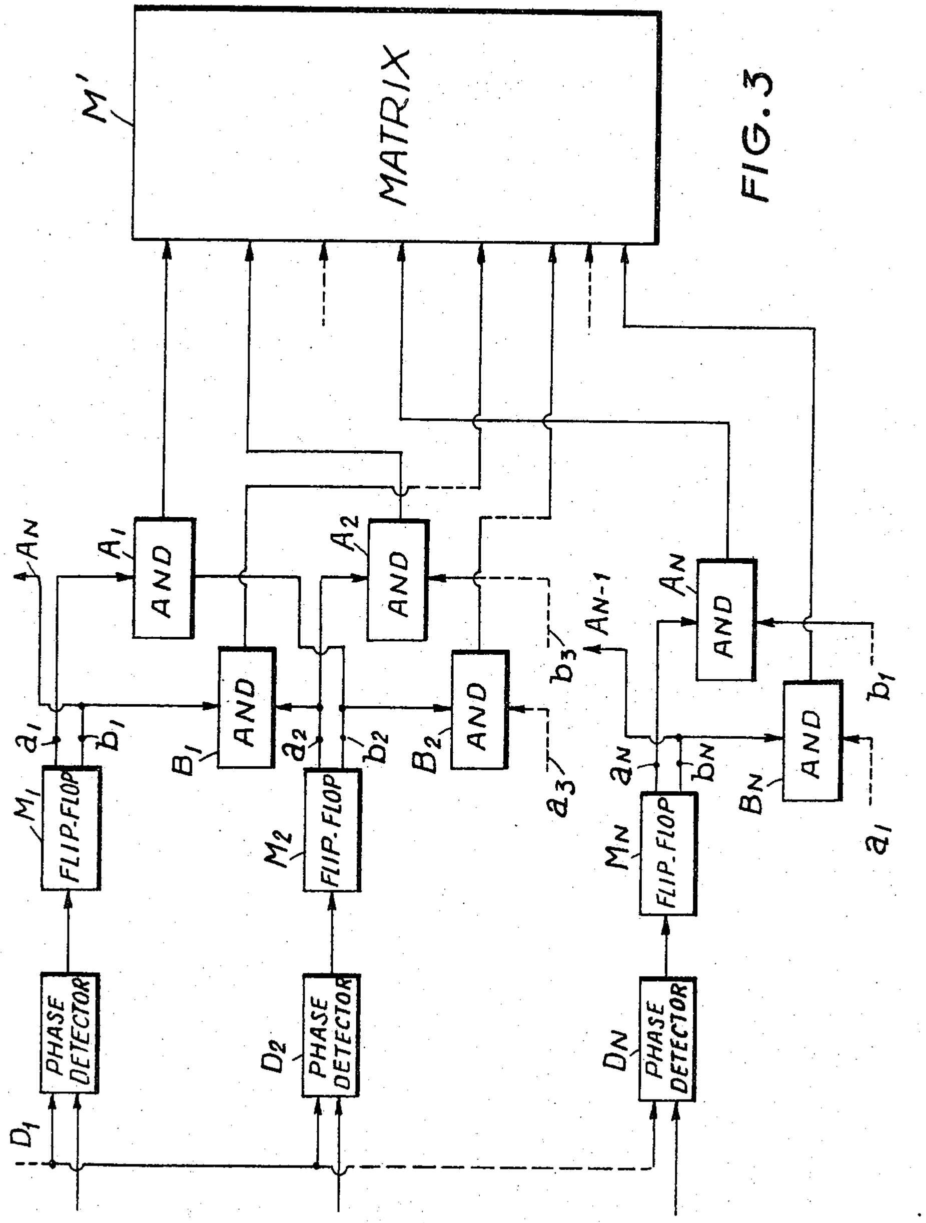

FIG. 3 shows the modifications to be brought to the circuit of FIG. 1 for use in connection with a $(n+1)$ digits matrix M'. N AND-circuits B*i* (with $$i=1, 2 \ldots N)$$

have their inputs respectively connected to outputs *bi* and *aj* (with $j=1+i$ if $i\neq N$ and $j=1$ if $i=N$) and their outputs coupled to N further inputs of matrix M', following in position the inputs to which gates A1 to AN are connected. According to whether the measured phase $\varphi$ is less or greater than $\pi$ the coding will be given by the output signal of an "AND"-circuit A*i* or by the output of an "AND"-circuit B*i*.

The same matrix can be used if the *n* digit precision is sufficient, only $N=2^{n-1}$ phase-shifters with a phase shift $$\varphi_0=\frac{\pi}{N}$$

being then used. The invention is of course not limited to the particular arrangements described. The wave shaping channels can be modified and/or simplified in accordance with the nature of the input signals. As a matter of fact in numerous applications, for example in pulsed radar systems, in moving targets indicator or speed measuring systems, terminal 1 is fed by a constant amplitude, undisturbed reference signal which can be applied directly to mixer 12. If necessary, input signals may be amplitude limited.

The frequency change obtained by means of oscillator 3 is aimed at keeping $\varphi_0$ constant, whatever the frequency fluctuations of the input signals. If the latter have a fixed frequency, oscillator 3 can either be omitted or replaced by a fixed frequency oscillator, according to the order of magnitude of the frequency involved.

What is claimed is:

1. A digital phase coder for measuring the phase difference between a first and a second sine waves of same frequency, said phase coder comprising:
  - a first and a second input;
  - means for applying said first and second sine waves respectively to said first and second inputs;
  - N identical phase-shifters, numbered 1 to N, N being a power of two, respectively imparting a phase shift $$\varphi_0=\frac{2\pi}{N}$$

said phase-shifters being coupled in series to said first input, and having respective outputs;
  - N phase detectors, numbered 1 to N, having respective first inputs coupled to said second input, respective second inputs respectively coupled to said outputs of said first to $N^{th}$ phase-shifters, and respective outputs;
  - N flip flop circuits, numbered 1 to N, having inputs respectively coupled to said outputs of said first to $N^{th}$ detectors and respective first and second outputs;
  - N AND-circuits, numbered 1 to N, each $i^{th}$ AND-circuit, where $i=1, 2 \ldots N$, having a first input coupled to the first output of said $i^{th}$ flip flop circuit and a second input coupled to the second output of the $j^{th}$ flip flop circuit, where $j=i+1$ if $i$ is smaller than N and 1 if $i=N$, said AND-circuits having respective outputs;
  - and an *n* digits binary coding matrix, where *n* is an integer such that $kN=2^n$, said matrix having *k*N inputs respectively coupled to said outputs of said AND-circuits.

2. A coder according to claim 1, wherein said means comprise a variable frequency oscillator supplying a third sine wave, means for mixing respectively said first and second sine waves with said third sine wave, and means for locking the frequency of said oscillator to the frequency of said first and second sine waves.

3. A digital phase coder for measuring the phase difference between a first and a second sine waves of same frequency, said phase coder comprising:
  - a first and a second input;
  - means for applying said first and second sine waves respectively to said first and second inputs;
  - N identical phase-shifters, numbered 1 to N, N being a power of two, of respective characteristic $\varphi_0$ such that $N\varphi_0=2\pi$, said phase-shifters being coupled in series to said first input, and having respective outputs;
  - N phase detectors, numbered 1 to N, having respective first inputs coupled to said second input, respective second inputs respectively coupled to said respective ouputs of said first to $N^{th}$ phase-shifters, and respective outputs;
  - N identical pairs of equal resistors connected in series, said pairs being numbered 1 to N, each $i^{th}$pair having a first terminal coupled to the $i^{th}$ phase detector output, a second terminal coupled to the $j^{th}$ phase detector output, where $j=i+1$ if $i$ is smaller than N and $j=1$ if $i=N$, and a central tap; 2N flip flop circuits, numbered 1 to N and 1' to N', each $i^{th}$ flip flop circuit where $i=1$ to $N$, having an input coupled to the $i^{th}$ detector output, and a first and a second output and each $i^{th}$ flip flop circuit, where $i'=1'$ to $N'$, having an input coupled to the central tap of the $i^{th}$ resistor pair, and a first and a second output;
  - 2N AND-circuits, numbered 1 to N and 1' to N', each $i^{th}$ AND-circuit, where $i=1$ to $N$, having a first input coupled to the first output of the $i^{th}$ flip flop circuit, a second input coupled to the second output of the $i'^{th}$ flip flop circuit, and an output, and each $i'^{th}$ AND-circuit, where $i'=1'$ to $N'$, having a first input coupled to the firist output of said $i'^{th}$ flip flop circuit, a second input coupled to the second output of the $j'^{th}$ flip flop circuit, where $j'=i'+1$ if $i'$ is smaller than $N'$ and $j'=1'$ if $i'=N$, and an output; and a $(n+1)$ digits binary starting matrix, where *n* is an integer such that $2^n=N$, said matrix having 2N inputs numbered 1 to 2N, respectively coupled to said outputs of said 2N AND-circuits, the $k^{th}$ input (with $k=2p-1$ where $p=1, 2, \ldots N$) being coupled to the output of the $i^{th}$ AND-circuit, with $i=p$, and the $m^{th}$ (with $m=2p$) being coupled to the output of the $i'^{th}$ AND-circuit, with $i'=p$.

4. A coder according to claim 3 wherein said means comprise: first and second frequency changing means supplying respectively a third and a fourth sine waves of equal frequency and having same phase difference as said first and second sine waves, and means for maintaining constant said last mentioned frequency.

5. A digital phase coder for measuring the phase difference between a first and a second sine waves of same frequency, said phase coder comprising:
- a first and a second general input;
- means for applying said first and second sine waves respectively to said first and second general input;
- N identical phase-shifters, numbered 1 to N, N being a power of two, of respective characteristic $\varphi_0$ such that $N\varphi_0=\pi$, said phase-shifters being coupled in series to said first general input, and having respective outputs;
- N phase detectors, numbered 1 to N, having respective first inputs coupled to said second general input, respective second inputs respectively coupled to said outputs of said first to $N^{th}$ phase-shifters, and respective outputs;
- N flip flop circuits, numbered 1 to N, having respective inputs respectively coupled to said outputs of the $N^{th}$ phase detectors, and respective first and second outputs;
- a first set of N AND-circuits, numbered 1 to N, each $i^{th}$ of said AND-circuits, where $i=1, 2, \ldots N$, having a first input coupled to the first output of the $i^{th}$ flip flop circuit and a second input coupled to the second output of the $j^{th}$ flip flop circuit, where $j=i+1$ if $i$ is smaller than $N$ and $j=1$ if $i=N$, said AND-circuits having respective outputs; a second set of N AND-circuits, numbered 1 to N, each $i^{th}$ AND-circuit of said second set having a first input coupled to the second output of the $i^{th}$ flip flop circuit and a second input coupled to the first output of the $j^{th}$ flip flop circuit, said AND-circuits of said second set having respective outputs;
- and a $(n+1)$ digit binary coding matrix, where $n$ is an integer such that $2^n=N$, said matrix having 2N inputs, the N first of said 2N inputs being respectively coupled to said outputs of the first to the $N^{th}$ AND-circuits of said first set, and the N last inputs being respectively coupled to said outputs of the first to the $N^{th}$ of said AND-circuits of said second set.

6. A phase coder according to claim 5 wherein said means comprises means for maintaining constant the respective phase shifts of said N phase-shifters.

7. A digital phase coder for measuring the phase difference between a first and a second sine waves of same frequency, said phase coder comprising:
- a comparator circuit having a first and a second input, N identical phase-shifters, N being such that $kN$ is a power of an integer B, $k$ being an integer smaller than three, connected in series to said first input, and $k$N outputs, respectively coupled to said phase-shifters and to said second input; means for applying said first and second sine waves respectively to said first and second inputs;
- and a $n$ digit coding matrix having a base B, where $n$ is an integer such that $kN=B^n$, said matrix having $k$N inputs respectively coupled to said outputs of said comparator circuit.

References Cited

UNITED STATES PATENTS

| | | | |
|---|---|---|---|
| 2,665,420 | 1/1954 | Winterhalter | 343—12 |
| 2,962,712 | 11/1960 | Hurvitz | 343—13 |
| 3,212,087 | 10/1965 | Blass | 343—13 |

DARYL W. COOK, *Acting Primary Examiner.*

J. H. WALLACE, *Assistant Examiner.*